Patented Mar. 2, 1943

2,312,309

UNITED STATES PATENT OFFICE 2,312,309

PROCESS FOR APPLYING LACQUER FILM HAVING A FLAT FINISH

Charles Bogin and Herbert L. Wampner, Terre Haute, Ind., assignors to Commercial Solvents Corporation, Terre Haute, Ind., a corporation of Maryland No Drawing. Application May 15, 1940,
Serial No. 335,324

3 Claims. (Cl. 117—168)

Our invention relates to a process for applying lacquer films having a flat finish, and to lacquer compositions suitable for this purpose.

Nitrocellulose lacquers have been found to have numerous advantageous properties, and have come into wide use in the art. Applied films of nitrocellulose lacquers, however, have a natural gloss which is disadvantageous for some applications where a flat finish is desired. Numerous materials, such as waxes, soaps, and the like, have been investigated as flattening agents for nitrocellulose lacquers. The waxes, however, have been found to delay unduly the drying and hardening of the lacquer films, thus eliminating the most outstanding advantage of nitrocellulose lacquers. Carnauba wax, which appeared less disadvantageous from this standpoint than most other waxes, was still found to be entirely unsatisfactory as a flattening agent for usual lacquer applications. Relatively large amounts of carnauba wax were required to secure a moderate degree of flattening, and the degree of flattening was found to change on aging lacquers containing this wax. The films were also found to have the disadvantageous property of "glossifying" if rubbed after drying. In view of these disadvantages and the high price of carnauba wax, this material was discarded as a possible flattening agent for lacquers. As a result, certain polyvalent metal soaps and non-hiding pigments such as diatomaceous earths have been practically the only agents employed in the usual applications of nitrocellulose lacquers to secure a flat finish.

We have now found, however, that in the application of nitrocellulose lacquers at temperatures substantially above atmospheric temperature, carnauba wax constitutes an excellent flattening agent, and has none of the disadvantages which caused it to be discarded for atmospheric temperature applications. We have found that flatter films can be produced by high temperature application than was possible at atmospheric temperature application, and that very much less carnauba wax is necessary for this purpose—usually as little as one-tenth as much as is needed for atmospheric temperature application. As a result, this very small amount of wax does not substantially delay the drying and hardening of the lacquer films. A further advantage of the use of this flattening agent in lacquers for high temperature application is the fact that even if the wax settles out of the lacquer on storage, it will go into solution at the application temperature; whereas for atmospheric temperatures application, difficulties are involved in properly suspending the settled wax. Other advantages of our new process will appear in the following description:

In accordance with our present invention, carnauba wax may be incorporated as a flattening agent in any nitrocellulose lacquer formulated for application at temperatures substantially above atmospheric temperature. In order to obtain complete solution of the wax at application temperature, however, the lacquer should be applied at a temperature of at least 50° C., and we prefer to employ application temperatures of 55° C., or above. Application at any temperature substantially above atmospheric temperature, will improve the flattening properties of our lacquers, but 55° C. appears to be the critical minimum with respect to obtaining optimum results.

Previously known procedure and formulation for high temperature application of nitrocellulose lacquers may be followed when employing carnauba wax as a flattening agent in accordance with our present invention. Suitable processes in this regard are set forth in U. S. Patent 2,150,096 by one of us, entitled "Process for applying cellulose derivative lacquers." As pointed out in this patent, the highest temperatures which can be successfully employed are dependent upon the degree of decomposition of the lacquer occurring in the time of heating required in the process. Generally, however, 120° C. may be considered a practical upper limit for the application of nitrocellulose lacquers.

For high temperature application the lacquers should contain slowly evaporating solvent constituents in order to secure satisfactory flow in the applied film, as discussed in U. S. Patent 2,150,096, referred to above. Aside from this modification of formulation to provide slowly-evaporating solvent constituents for satisfactory flow, previously known principles of formulation for nitrocellulose lacquers to be applied at atmospheric temperatures may be followed. Any of the usual constituents of lacquers may be incorporated, as, for example, plasticizers, resins, pigments, and the like. Non-solvents or diluents may be used in conjunction with active solvents, in accordance with usual practices, and the usual safety factor of an excess of active solvent over the tolerance value should, of course, be employed. In general it may be said that our invention may be used in conjunction with any nitrocellulose lacquer formulated in accordance with prior practices for high temperature application, and applied by any known procedure at a temperature substantially above atmospheric temperature.

The amount of carnauba wax to be employed as a flattening agent, in accordance with our invention, may be varied to a considerable extent, depending on the degree of flattening desired. Increasing amounts of wax will in general increase the degree of flattening, but an excessive amount of wax is undesirable from the standpoint of producing films which tend to "glossify" on rubbing or polishing. The wax should be present in excess of the amount which is soluble in the lacquer at atmospheric temperatures, but preferably not in excess of the amount which is soluble at the application temperature. In general we have found that from 0.3% to 3.0% of carnauba wax, based on the weight of the solid constituents of the lacquer, will be satisfactory, and we prefer to employ approximately 0.75% by weight, for most purposes.

The carnauba wax may be incorporated in the lacquer by any suitable procedure as, for example,, by grinding the wax into a concentrated stock flattening lacquer and adding a small amount of this concentrated flattening stock to the remainder of the lacquer. The wax should preferably be incorporated in the lacquer in a manner such that excess wax left undissolved at atmospheric temperature will be in a finely-divided form, to facilitate its solution when the lacquer is heated to application temperature. Numerous suitable methods for this purpose will of course be evident to those skilled in the art.

Our invention may be further illustrated by the following specific examples:

EXAMPLE I

The following lacquer illustrates a lacquer of high solids content, for spray application at 90° C.:

| | Parts by weight |
|---|---|
| Nitrocellulose (½ sec.) | 18.0 |
| Resin (maleic anhydride modified ester gum) | 18.0 |
| Resin (oil-modified glycerol-phthalate resin "Rezyl 19") | 9.0 |
| Dibutyl phthalate | 6.0 |
| Carnauba wax | 0.4 | incorporated in 100 parts by weight of the following solvent mixture:

| | Per cent by volume |
|---|---|
| Butyl alcohol | 20 |
| Butyl acetate | 50 |
| Xylol | 30 |

EXAMPLE II

The following formulation illustrates a lacquer prepared from 5 sec. nitrocelluse for spray application at 60° C.:

| | Parts by weight |
|---|---|
| Nitrocellulose (5 sec.) | 8 |
| Ester gum | 8 |
| Dewaxed damar gum | 8 |
| Dibutyl phthalate | 3 |
| Carnauba wax | 0.3 | incorporated in 100 parts by weight of the following solvent mixture:

| | Per cent by volume |
|---|---|
| Ethyl alcohol | 15 |
| Butyl alcohol | 15 |
| Butyl acetate | 35 |
| Toluol | 20 |
| Petroleum naphtha | 15 |

EXAMPLE III

The following example illustrates a brushing lacquer formulated for application at 55° C.:

| | Parts by weight |
|---|---|
| Nitrocellulose (¼ sec.) | 15 |
| Ester gum | 15 |
| Raw castor oil | 12 |
| Titanium dioxide | 17 |
| Zinc oxide | 4 |
| Carnauba wax | 0.5 | incorporated in 100 parts by weight of the following solvent mixture:

| | Per cent by volume |
|---|---|
| Ethyl alcohol | 15 |
| Butyl alcohol | 15 |
| Butyl acetate | 30 |
| Toluol | 40 |

EXAMPLE IV

The following formulation illustrates a lacquer designed for paper coating by machine application, at a temperature of 55° C.:

| | Parts by weight |
|---|---|
| Nitrocellulose (½ sec.) | 24 |
| Dibutyl phthalate | 17 |
| Carnauba wax | 0.3 | incorporated in 100 parts by weight of the following solvent mixture:

| | Per cent by volume |
|---|---|
| Ethyl acetate | 10 |
| Ethyl alcohol | 10 |
| Butyl acetate | 20 |
| Butyl alcohol | 5 |
| Toluol | 55 |

It should be understood, of course, that the above examples are merely illustrative, and do not limit the scope of our invention. Various equivalent materials may be substituted for those specified in the examples, and the formulations may be modified in accordance with previous practices in this art. Likewise, the lacquers may be applied by methods other than those specified in the examples, and in general it may be said that the use of any equivalents or modifications of procedure, which would naturally occur to those skilled in the art, is included within the scope of our invention.

Our invention now having been described, what we claim is:

1. The process of forming a nitrocellulose lacquer film with a flat finish comprising applying the lacquer to a base while the lacquer is hot and at a temperature substantially above atmospheric temperature but below a temperature at which excessive decomposition of the lacquer occurs due to heat, the lacquer containing carnauba wax in an amount ranging from approximately 0.3 per cent to approximately 1.1 per cent based on the weight of the solid constituents of the lacquer, which is substantially completely soluble in said lacquer at said application temperature but in excess of that which is soluble in said lacquer at atmospheric temperature, the said amount of wax being below that required to produce the same degree of flattening with the same lacquer when applied at atmospheric temperature, such an amount of carnauba wax not substantially delaying the drying and hardening of said lacquer film.

2. The process of claim 1 in which the application temperature is 55–120° C.

3. The process of claim 1 in which the application temperature is 60–90° C. and the amount of wax in the lacquer is approximately 0.75 per cent based on the weight of the solid constituents of said lacquer.

CHARLES BOGIN.
HERBERT L. WAMPNER.